US007822198B2

(12) United States Patent
Borgen

(10) Patent No.: US 7,822,198 B2
(45) Date of Patent: Oct. 26, 2010

(54) PARALLEL ENCRYPTOR AND DECRYPTOR

(75) Inventor: Gary S. Borgen, Camarillo, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 947 days.

(21) Appl. No.: 11/657,308

(22) Filed: Jan. 23, 2007

(65) Prior Publication Data

US 2008/0175378 A1    Jul. 24, 2008

(51) Int. Cl.
*H04L 9/00* (2006.01)
(52) U.S. Cl. .......................................... 380/42; 375/215
(58) Field of Classification Search .................... 380/42
See application file for complete search history.

(56) References Cited

OTHER PUBLICATIONS

Chan, H.; Hodjat, A.; Shi, S.; Wesel, R.; Verbauwhede, I. "Streaming Encryption for a Secure Wavelength and Time Domain Hopped Optical Network", Proceedings of the International Conference on Information Technology: Coding and Computing (ITCC 2004), vol. 2, pp. 580-582.*

* cited by examiner

*Primary Examiner*—Hai Tran
*Assistant Examiner*—Tracy Mangialaschi
(74) *Attorney, Agent, or Firm*—David S. Kalmbaugh; Christopher L. Blackburn

(57) ABSTRACT

An encryptor/decryptor which receives a continuous parallel data stream either in a single-ended TTL or a Low Voltage Differential Signaling format. The encryptor/decryptor selectively encrypts or decrypts the incoming data stream, using an LVDS encryptor/decryptor and then outputs the data stream in either a LVDS or TTL parallel format.

20 Claims, 2 Drawing Sheets

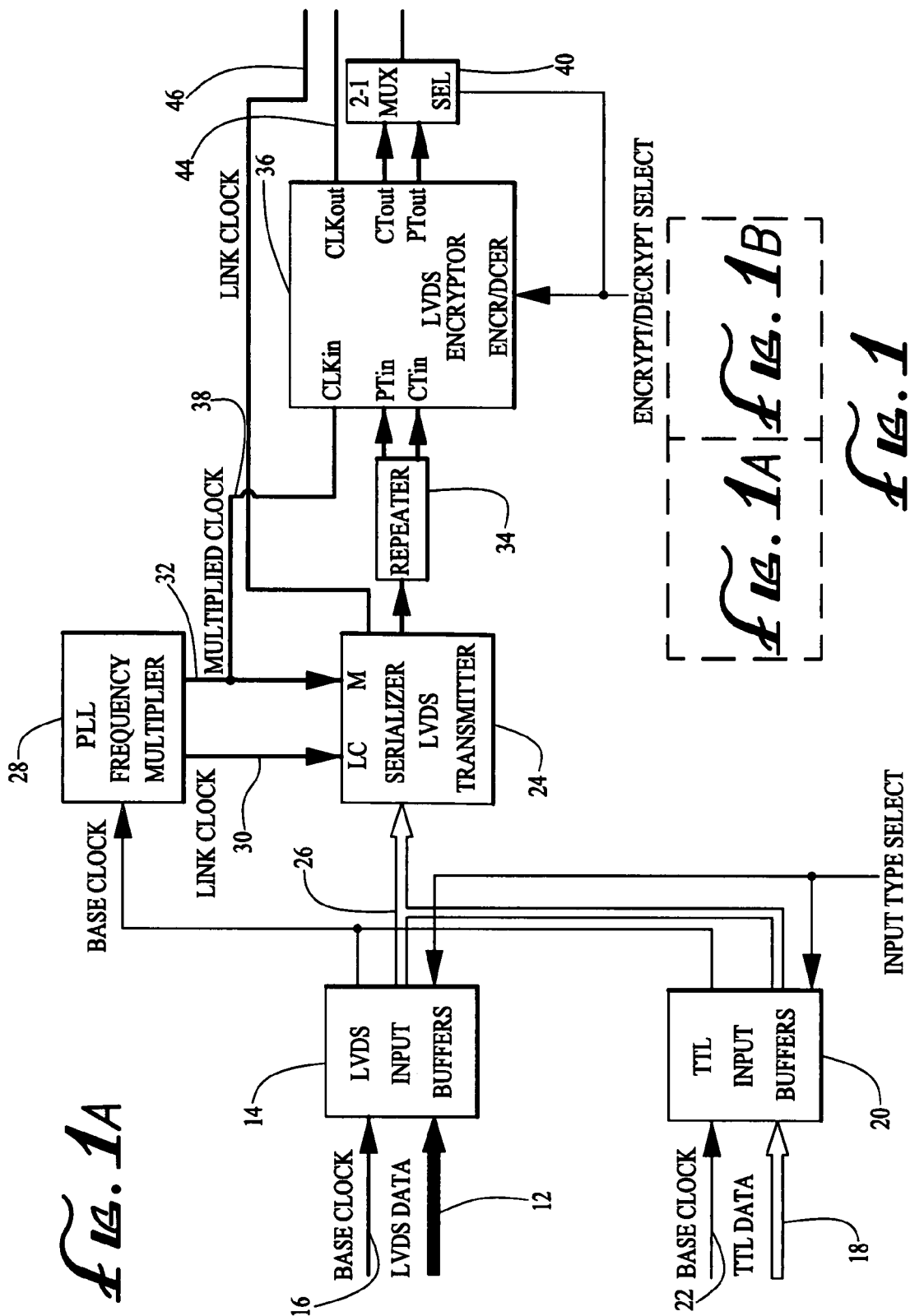

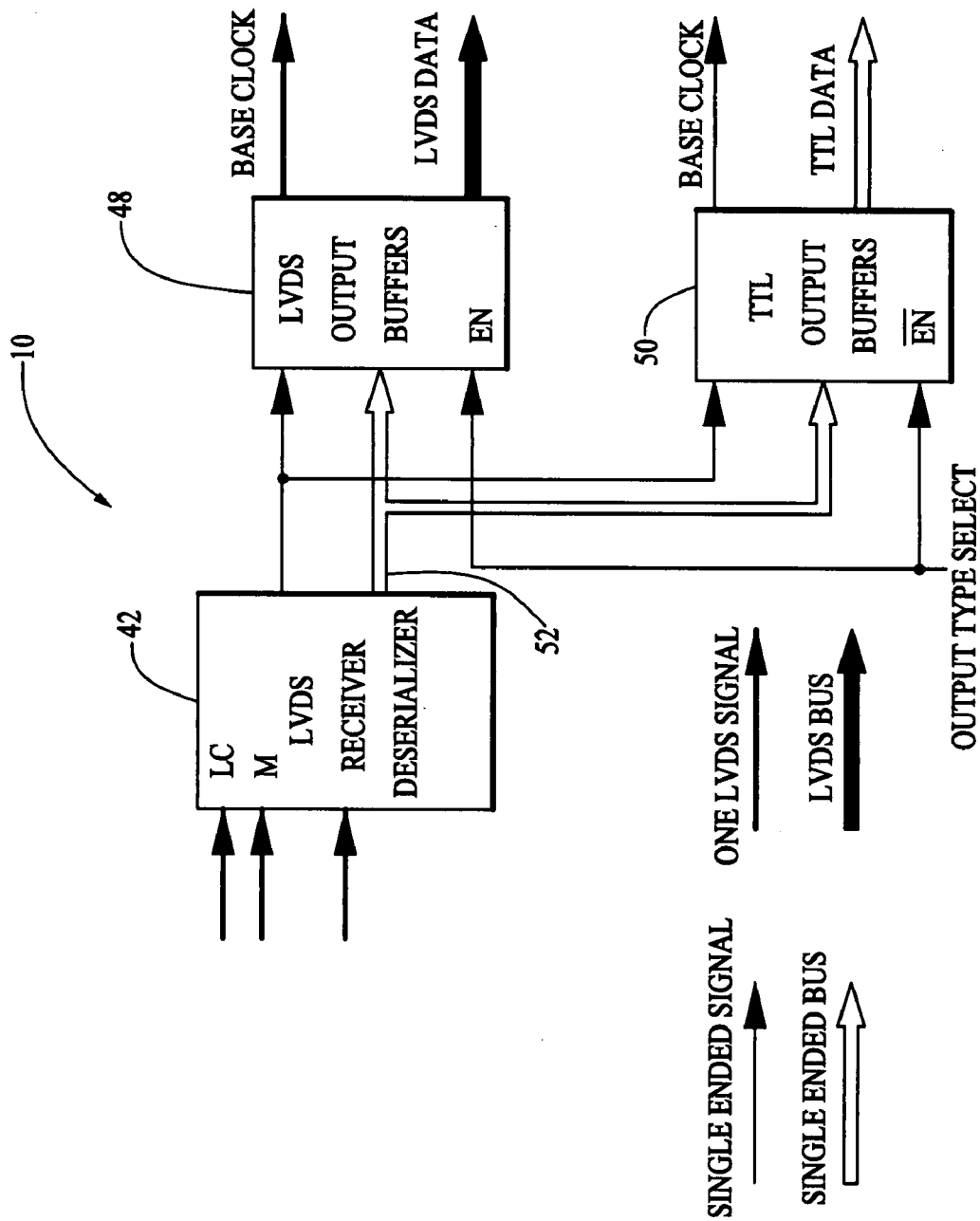

PARALLEL ENCRYPTOR AND DECRYPTOR

BACKGROUND OF THE INVENTION

1. Field of the Invention

The present invention relates generally to encryption devices. More particularly, the present invention relates to an encryptor which accepts a parallel data stream in either a single-ended (SE) TTL format or a Low Voltage Differential Signaling (LVDS) format, encrypts or decrypts the incoming data, and outputs the data from the encryptor in either a SE TTL or LVDS parallel format.

2. Description of the Prior Art

The National Security Agency (NSA) utilizes a variety of encryption devices to encrypt for transmission from one location to another. There is also a requirement that the encrypted data be decrypted when the data arrives at a receiving station. The encryption devices currently in use by NSA, that fit the required form factor, have serial interfaces, i.e. data words are received in a serial format.

A general purpose encryptor/decryptor operates at very high speeds and uses standard interface logic levels and key protocols. Data is transmitted as a parallel data stream, either in a single-ended (SE) TTL format or a Low Voltage Differential Signaling (LVDS) format. Since the encryptor/decryptor often utilizes a serial interface and data is provided to the encryptor/decryptor in one of two parallel formats, there is a need to convert the data for encryption or decryption from parallel data to serial data.

(a) Further, there is a need to encrypt a high speed parallel data source, prior to the data being stored in a digital data recorder. The encryptor must be small enough to fit in a target drone. In addition, there is a need to decrypt the data after the required information has been recorded.

(b) Further, there is a need to encrypt a high speed parallel data source, prior to the data being stored in a digital data recorder. The encryptor must be small enough to fit in a target drone. In addition, there is a need to decrypt the data after the required information has been recorded.

SUMMARY OF THE INVENTION (a) The present invention comprises an encryption device which selectively encrypts or decrypts incoming data at very high speeds. The data is input to the encryption device as a continuous parallel data stream which may be, for example, eight bits wide. The parallel data stream includes a coincidental clock. The format for the data stream is either a single-ended TTL format or a Low Voltage Differential Signaling (LVDS) format.

(b) The present invention comprises an encryption device which selectively encrypts or decrypts incoming data at very high speeds. The data is input to the encryption device as a continuous parallel data stream which may be, for example, eight bits wide. The parallel data stream includes a coincidental clock. The format for the data stream is either a single-ended TTL format or a Low Voltage Differential Signaling (LVDS) format.

The encryption device uses an LVDS encryptor/decryptor which receives data and clock signals in a serial LVDS format. A PPL Frequency Multiplier and a Serializer-LVDS transmitter convert the incoming parallel data stream into a serial LVDS data stream and a LVDS base clock signal. The data stream operates at eight times the base clock input rate which requires the PPL Frequency Multiplier to generate a second clock signal having a frequency eight times the base clock signal.

A pair of dual multiplexed LVDS repeaters are used to direct the input data to the appropriate input of the LVDS encryptor/decryptor, direct the output data to the appropriate output of the LVDS encryptor/decryptor and to set the mode of operation of the encryptor/decryptor to either encryption or decryption.

An LVDS Receiver-Deserializer reconverts the processed serial data stream into a parallel format. Output buffers having complimentary enables are used to convert the parallel data stream into an LVDS or TTL compatible data format.

BRIEF DESCRIPTION OF THE DRAWING

FIGS. 1A and 1B is an electrical schematic diagram of the parallel encryptor/decryptor comprising the present invention.

DETAILED DESCRIPTION OF A PREFERRED EMBODIMENT

Referring to FIGS. 1A and 1B, there is shown a parallel encryptor/decryptor 10 which selectively encrypts or decrypts incoming data at very high speeds. The data is input to encryptor/decryptor 10 as a continuous parallel data stream which may be, for example eight bits wide. The parallel data stream input to encryptor/decryptor 10 includes a coincidental clock. The format for the data stream is either a single-ended TTL format or a Low Voltage Differential Signaling (LVDS) format.

At this time it should be noted that the LVDS is a differential signaling system which transmits two different voltages via two wires for comparison at a receiver. LVDS uses the difference in voltage between the two wires to encode information. LVDS has a low differential voltage swing with a typical voltage swing of 350 mV with an offset voltage of 1.25 Volts above ground. The maximum data rate specified for LVDS applications is 655 Mbps.

TTL which is called transistor-transistor logic utilizes 0-5 VDC as the basis for defining logic levels. A TTL signal is defined as low or L when between 0 VDC and 0.8 VDC and a high or H between 2 VDC and 5 VDC.

The LVDS data is supplied via an eight bit wide data bus 12 to LVDS input buffers 14. A base clock is also supplied to input buffers 14 via a clock signal transmission line 16. The base clock has a frequency of 20 MHz. The outputs from buffers 14 are single ended, that is the voltage levels for the LVDS data and the base clock are 0 to 3.3 volts, as opposed to the input voltage which is differential.

In a like manner, the TTL data is supplied via an eight bit wide data bus 18 to TTL input buffers 20. The base clock is also supplied to input buffers 20 via a clock signal transmission line 22.

Buffers 14 comprise three LVDS Quad Differential Line Receivers, Model No. SN65LVDS048A commercially available from Texas Instruments of Dallas, Tex. Buffers 20 comprise a 16-Bit Buffer with 3-State Outputs, Model No. 74AC16244 also commercially available from Texas Instruments.

Buffers 14 and 20 have complimentary enable inputs which are used to select which format is processed by encryptor/decryptor 10. When the input enable signal is at the logic one state, the LVDS data stream is provided to a Serializer LVDS Transmitter 24 via a parallel data bus 26. When the input enable signal is at the logic zero state, the TTL data stream is provided to Serializer LVDS Transmitter 24 via parallel data bus 26. The 3-State Output of Buffers 20 provide outputs identical to the outputs for buffers 14, which allows for transmission of TTL data over bus 26 and processing by Serializer LVDS Transmitter 24.

Data is parallel loaded into the input latches of Serializer LVDS Transmitter 24 on the rising edge of a Multiplied Clock signal supplied to an M-clock input of Serializer LVDS Transmitter 24 following a rising edge of a link clock signal supplied to the link clock (L-clock) reference input of Transmitter 24. The data is read out serially from shift registers within Serializer LVDS Transmitter 24 on the rising edges of the Multiplied Clock signal. The link clock signal function as a synchronizing clock signal.

The data output from Serializer LVDS Transmitter 24 is a serial data stream in an LVDS format running at a 160 megabits per second.

The Serializer LVDS Transmitter 24 is a Mulxt™ Serializer-Transmitter, Model No SN65LVDS151 commercially available from Texas Instruments.

A phase lock loop frequency multiplier 28 receives the base clock from buffers 14 and 20 and then multiplies the base clock by eight to obtain the multiplied clock signal used to convert the incoming data stream from parallel to serial data. The multiplied clock signal, which has a frequency of 160 MHz, is transmitted to Serializer LVDS Transmitter 24 via signal lines 32. The link clock is transmitted to Serializer LVDS Transmitter 24 via signal lines 30.

The clock signal multiplication factor is dependent on the word length. If a different data word length is required, the multiplication factor would be equal to width in bits of each data word. For example a ten bit word would require multiplication of the base clock by ten.

The frequency multiplier 28 is a Mulxt™ PLL (phase lock loop) Frequency Multiplier Model No. SN65LVDS150 commercially available from Texas Instruments.

The serial LVDS data is transferred to a dual multiplexed LVDS repeater 34. Repeater 34 is a Dual Multiplex LVDS Repeater, Model No. SN65LVDS22 commercially available from Texas Instrument. Repeater 34 supplies the serial LVDS data to the PTin (plain text in) input of an LVDS encryptor 36 and the CTin (cipher text in) input of LVDS encryptor 36. The PTin input of encryptor 36 receives data for encryption and the CTin input of encryptor 36 receives data for decryption. Encrypted data is output via the CTout output of encryptor 36, while decrypted data is output via the PTout output of encryptor 36.

Frequency multiplier 28 transmits the multiplied clock signal to LVDS encryptor 36 via a signal line 38. Encryptor 36 has a ENCR/DECR input which receives an encryption control signal. The encryption control signal is used to set encryptor 36 to either encrypt serial LVDS data or decrypt serial LVDS data depending upon the logic state of the encryption control signal. A logic one state for the encryption control signal encrypts data and a logic zero state for the encryption control signal decrypts data.

The encryption control signal is also supplied to a multiplexer 40 which receives encrypted data from the CTout output of LVDS encryptor 36 and plain text data from the PTout output of LVDS encryptor 36. The logic state of the encryption control signal sets multiplexer 40 to pass the encrypted LVDS data through multiplexer 40 to the data input of LVDS receiver deserializer 42 or the plain text LVDS data through multiplexer 40 to the data input of LVDS receiver deserializer 42.

Multiplexer 40 is a Dual Multiplex LVDS Repeater, Model No. SN65LVDS22 commercially available from Texas Instrument. LVDS receiver deserializer 42 is a Muxlt™ Receiver-Deserializer, Model No. SN65LVDS152 commercially available Texas Instrument.

Serial LVDS data is serial shifted into a shift register of LVDS receiver deserializer 42 on the falling edge of the Multiplied Clock signal which is provided to the M-clock input of deserializer 42 via signal line 44. The Serial LVDS data is latched out in parallel from the shift register within deserializer 42 on the second falling edge after the first rising edge of the Multiplied Clock signal following the rising edge of the link clock signal. The link clock signal is supplied to the link clock (L-clock) reference input of deserializer 42 via signal line 46. The output from deserializer 42 is provided in a parallel single ended format, i.e. 0 volts to 3.3 volts.

The processed parallel data stream from LVDS receiver deserializer 42 is supplied to LVDS output buffers 48 and TTL output buffers 50 via an eight bit wide parallel data bus 52. An output enable signal is also supplied to buffers 48 and 50. The enable signal is used to convert the processed parallel data into an LVDS compatible data stream or a TTL compatible data stream which is supplied to a digital data recorder. When the output enable signal is at the logic one state LVDS Output buffers 48 output a parallel LVDS data stream eight bits wide in a LVDS format. When the output enable signal is at the logic zero state TTL Output buffers 48 output a parallel TTL data stream eight bits wide in a single-ended TTL format.

The LVDS output buffers 48 are three LVDS Quad Differential Line Drivers, Model No. SN65LVDS047, commercially available from Texas Instrument. The TTL output buffers 50 comprise a 16-Bit Buffer with 3-State Outputs, Model No. 74AC16244 also commercially available from Texas Instruments.

The present invention is capable of encrypting or decrypting data having parallel word sizes ranging from 4 to 10 bits in width and data rates ranging from 5 to in excess of 25 Mbytes per second.

From the foregoing it may readily be seen that the present invention comprises a new, unique and exceedingly useful encryption device for encrypting or decrypting a parallel LVDS or TTL data stream which constitutes a considerable improvement over the known prior art. Obviously many modifications and variations of the present invention are possible in light of the above teachings. It is therefore to be understood that within the scope of the appended claims that the invention may be practiced otherwise than specifically described.

What is claimed is:

1. An encryption device for selectively encrypting, or decrypting first and second data streams comprising:
 (a) a first buffer for receiving said first data stream which has a parallel Low Voltage Differential Signaling (LVDS) format and an input enable signal;
 (b) a second buffer for receiving said second data strewn which has a parallel Transistor-Transistor Logic (TTL) format and said input enable signal;
 (c) said first buffer passing said first data stream through said first buffer to a first data bus when said input enable signal is at a first logic state and said second buffer passing said second data stream through said second buffer to said first data bus when said input enable signal is at a second logic state;
 (d) a frequency multiplier for generating a first LVDS clock signal and a second LVDS clock signal which has a frequency n times the frequency of said first LVDS clock signal;
 (e) a serializer transmitter for receiving said first and second LVDS clock signals from said frequency multiplier, said first data stream from said first data bus and said second data stream from said first data bus, said serializer transmitter, responsive to said first and second LVDS clock signals, converting said first and second data streams to an LVDS serial format;

(f) an encryptor for receiving said first and second data streams from said serializer transmitter, and an encryption control signal, said encryptor, responsive to a pair of logic states for said encryption control signal, selectively encrypting or decrypting said first and second data streams;

(g) a receiver deserializer for receiving said first LVDS clock signal from said serializer transmitter, said receiver deserializer receiving said second LVDS clock signal, and said first and second data streams from said encryptor after said encryptor selectively encrypts or decrypts said first and second data streams, said receiver deserializer responsive to said first and second LVDS clock signals, reconverting said first and second data streams to said LVDS parallel format and then providing said first and second data streams to a second data bus;

(h) a third buffer for receiving an output enable signal and said first data stream from second data bus;

(i) a fourth buffer for receiving said output enable signal and second data stream from said second data bus; and (j) said third buffer passing said first data stream through said third buffer to a first data recorder when said output enable signal is at a first logic state and said fourth buffer passing said second data stream through said fourth buffer to a second data recorder when said output enable signal is at a second logic state.

2. The encryption device of claim 1 wherein the frequency of said second LVDS clock signal is determined by a word length for each data word of said first and second data streams.

3. The encryption device of claim 2 wherein the frequency of said second LVDS clock signal is eight times the frequency of said first LVDS clock signal when the word length for said first and second parallel data streams is eight bits.

4. The encryption device of claim 1 wherein said first and second data buses are parallel LVDS data buses.

5. The encryption device of claim 1 wherein said encryption device is capable of encrypting or decrypting data having parallel word sizes ranging from 4 to 10 bits in width and data rates ranging from 5 Mbytes per second to approximately 35 Mbytes per second.

6. The encryption device of claim 1 wherein said frequency multiplier is a phase lock loop frequency multiplier which multiplies the frequency for said second LVDS clock signal by n times the frequency of said first LVDS clock signal wherein n has a range of four to ten.

7. An encryption device for selectively encrypting or decrypting first and second data streams comprising:

(a) a first buffer for receiving said first data stream which has a parallel Low Voltage Differential Signaling (LVDS) format and an input enable signal;

(b) a second buffer for receiving said second data stream which has a parallel Transistor-Transistor Logic (TTL) format and said input enable signal;

(c) said first buffer passing said first data stream through said first buffer to a first data bus when said input enable signal is at a first logic state and said second buffer passing said second data stream through said second buffer to said first data bus when said input enable signal is at a second logic state;

(d) a frequency multiplier for generating a first LVDS clock signal and a second LVDS clock signal which has a frequency n times the frequency of said first LVDS clock signal wherein n has a range of four to ten;

(e) a serializer transmitter for receiving said first and second LVDS clock signals from said frequency multiplier, said first data stream from said first data bus and said second data stream from said first data bus, said serializer transmitter, responsive to said first and second LVDS clock signals, converting said first and second data streams to an LVDS serial format;

(f) a repeater for receiving said first and second data streams from said serializer transmitter and then passing said first and second data streams through said repeater to a data stream output for said repeater;

(g) an encryptor for receiving said first and second data streams from said repeater, and an encryption control signal, said encryptor, responsive to a pair of logic states for said encryption control signal, selectively encrypting or decrypting said first and second data streams;

(h) a multiplexer for receiving said first and second data streams from said encryptor and said encryption control signal, said multiplexer, responsive to the pair of logic states for said encryption control signal, passing through said multiplexer said first or second data stream after said encryptor selectively encrypts or decrypts said first and second data streams;

(i) a receiver deserializer for receiving said first LVDS clock signal from said serializer transmitter, said receiver deserializer receiving said second LVDS clock signal, and said first and second data streams from said multiplexer, said receiver deserializer, responsive to said first and second LVDS clock signals, reconverting said first and second data streams to a second data bus;

(j) a third buffer for receiving an output enable signal and said first data stream from second data bus;

(k) a fourth buffer for receiving said output enable signal and second data stream from said second data bus; and (l) said third buffer passing said first data stream through said third buffer to a first data recorder when said output enable signal is at a first logic state and said fourth buffer passing said second data stream through said fourth buffer to a second data recorder when said output enable signal is at a second logic state.

8. The encryption device of claim 7 wherein said multiplexer, responsive to a first logic state for said encryption control signal, passes through said first and second data streams after said encryptor encrypts said first and second data streams.

9. The encryption device of claim 7 wherein said multiplexer, responsive to a second logic state for said encryption control signal, passes through said first and second data streams after said encryptor decrypts said first and second data streams.

10. The encryption device of claim 7 wherein said first and second data buses are parallel LVDS data buses.

11. The encryption device of claim 7 wherein said encryption device is capable of encrypting or decrypting data having parallel word sizes ranging from 4 to 10 bits in width and data rates ranging from 5 Mbytes per second to approximately 35 Mbytes per second.

12. The encryption device of claim 7 wherein said frequency multiplier is a phase lock loop frequency multiplier which multiplies the frequency for said second LVDS clock signal by n times the frequency of said first LVDS clock signal wherein n has a range of four to ten.

13. A method for selectively encrypting or decrypting first and second data streams comprising the steps of:

(a) receiving said first and second data streams wherein said first data stream has a Low Voltage Differential Signaling (LVDS) format and said second data stream has a Transistor-Transistor Logic (TTL) format, and said first and second data streams consist of first and second input parallel data streams;
(b) receiving an input enable signal;
(c) converting said first data stream from a differential voltage to a single ended voltage having a voltage range of approximately 0 volts to approximately 3.3 volts, in response to one of a pair of logic states for said input enable signal;
(d) converting said first data stream and said second data stream to first and second serial data streams having said LVDS format;
(e) providing an encryption control signal having first and second logic states;
(f) encrypting said first and second serial data streams when said encryption control signal is at said first logic state;
(g) decrypting said first and second serial data streams when said encryption control signal is at said second logic state, wherein an encryption device encrypts or decrypts said first and second serial data streams;
(h) converting said first and second serial data streams to first and second output parallel data streams after said encryption device encrypts or decrypts said first and second serial data streams;
(i) receiving an output enable signal;
(j) converting said first output parallel data stream from said single ended voltage to said differential voltage, in response to one of two logic states for said output enable signal; and
(k) providing said second output parallel data stream in said TTL format to an external recording device in response to other of the two logic states for said output enable signal.

14. The method of claim 13 further comprising the steps of:
(a) receiving a first LVDS clock signal;
(b) multiplying said first LVDS clock signal by a factor of n to generate a second LVDS clock signal having a frequency n times the frequency of said first LVDS clock signal; and
(c) providing said first LVDS clock signal and said second LVDS clock signal to a serializer transmitter, said serializer transmitter, responsive to said first LVDS clock signal and said second LVDS clock signal, converting said first and second input parallel data streams to said first and second input serial data streams.

15. The method of claim 14 further comprising the step of providing said first LVDS clock signal and said second LVDS clock signal to a receiver deserializer, said receiver deserializer, responsive to said first LVDS dock signal and said second LVDS clock signal converting said first and second input serial data streams to said first and second output parallel data streams after said encryption device encrypts or decrypts said first and second input serial data streams.

16. The method of claim 13 wherein a phase lock loop frequency multiplier multiplies the frequency for said second LVDS clock signal by n times the frequency of said first LVDS clock signal wherein n has a range of four to ten.

17. The method of claim 13 further comprising the step of passing said first input serial data stream or said second input serial data stream through a multiplexer after said encryption device encrypts or decrypts said first and second input serial data streams, wherein said first input serial data stream or said second input serial data stream are passed through said multiplexer in response to the first and second logic states of said encryption control signal.

18. The method of claim 13 further comprising the step of determining a value for n, wherein the value for n is determined by a word length for each data word of said first and second data streams.

19. The method of claim 18 wherein the value for n has a range of four to ten.

20. The method of claim 13 wherein said encryption device is capable of encrypting or decrypting data having parallel word sizes ranging from 4 to 10 bits in width and data rates ranging from 5 Mbytes per second to approximately 35 Mbytes per second.

* * * * *